United States Patent
Ali et al.

(10) Patent No.: US 7,506,043 B2
(45) Date of Patent: Mar. 17, 2009

(54) WIRELESS LOCAL AREA NETWORK RADIO RESOURCE MANAGEMENT ADMISSION CONTROL

(75) Inventors: Ahmed Ali, Verdun (CA); Angelo Cuffaro, Laval (CA); Christopher Cave, Candiac (CA); Paul Marinier, Brossard (CA)

(73) Assignee: InterDigital Technology Corporation, Wilmington, DE (US)

( * ) Notice: Subject to any disclaimer, the term of this patent is extended or adjusted under 35 U.S.C. 154(b) by 503 days.

(21) Appl. No.: 10/977,041

(22) Filed: Oct. 29, 2004

(65) Prior Publication Data

US 2005/0197148 A1 Sep. 8, 2005

Related U.S. Application Data

(60) Provisional application No. 60/534,921, filed on Jan. 8, 2004.

(51) Int. Cl.
*G06F 15/173* (2006.01)
(52) U.S. Cl. ............... 709/223; 709/224; 370/230; 370/235
(58) Field of Classification Search .......... 709/223, 709/224, 225, 227, 229; 370/230, 230.1, 370/232, 235; 455/522, 524, 525
See application file for complete search history.

(56) References Cited

U.S. PATENT DOCUMENTS

| | | | | |
|---|---|---|---|---|
| 5,982,748 A | * | 11/1999 | Yin et al. ................. | 370/232 |
| 6,028,842 A | * | 2/2000 | Chapman et al. ............ | 370/235 |
| 6,366,559 B1 | * | 4/2002 | Krishnan et al. ............ | 370/230 |
| 7,403,531 B2 | * | 7/2008 | Ho et al. .................. | 370/395.4 |
| 2002/0057649 A1 | | 5/2002 | Kinnunen | |
| 2003/0093526 A1 | * | 5/2003 | Nandagopalan et al. ..... | 709/225 |

(Continued)

FOREIGN PATENT DOCUMENTS

WO 99/23842 5/1999

(Continued)

OTHER PUBLICATIONS

Garg et al., "Using IEEE 802.11e MAC for QoS over Wireless," Conference Proceedings of the 2003 IEEE International Performance, Computing, and Communications Conference, pp. 537-542 (2003).

(Continued)

*Primary Examiner*—Lashonda T Jacobs
(74) *Attorney, Agent, or Firm*—Volpe and Koenig, P.C.

(57) ABSTRACT

In a wireless local area network having an access point (AP) and at least one station, wherein data is prioritized by access categories, a method for admission control begins by calculating a transmission budget for each access category (AC) and a total transmission budget for all ACs requiring admission control. A traffic stream admission request is sent from a station to the AP. A medium time value for the traffic stream is calculated at the AP, based on information extracted from the admission request. The medium time value is compared to the transmission budget for the AC corresponding to the traffic stream and the total transmission budget. The traffic stream is accepted if the medium time value is not greater than both the transmission budget for the AC corresponding to the traffic stream and the total transmission budget; otherwise, the traffic stream is rejected.

9 Claims, 2 Drawing Sheets

U.S. PATENT DOCUMENTS

| | | | |
|---|---|---|---|
| 2004/0090979 A1* | 5/2004 | Xu | 370/444 |
| 2004/0090982 A1* | 5/2004 | Xu | 370/447 |
| 2004/0092268 A1* | 5/2004 | Xu | 455/450 |
| 2005/0147041 A1* | 7/2005 | Zaki et al. | 370/235 |
| 2006/0099933 A1* | 5/2006 | Benveniste | 455/412.1 |
| 2006/0116128 A1* | 6/2006 | Benveniste | 455/445 |
| 2006/0268702 A1* | 11/2006 | Ali et al. | 370/230 |
| 2007/0147241 A1* | 6/2007 | Wang et al. | 370/230 |

FOREIGN PATENT DOCUMENTS

| | | |
|---|---|---|
| WO | 02/052869 | 7/2002 |

OTHER PUBLICATIONS

Godfrey, "Inside 802.11e: Making QoS a Reality Over WLAN Connections", http://www.commsdesign.com/printableArticle/?articleID=1700038.

Hiertz et al., "The Evolution of Wireless LANs and PANs—Analysis of IEEE 802.11 E for QoS Support in Wireless LANS," IEEE Personal Communications, IEEE Communications Society, vol. 10, No. 6, pp. 40-50, XP011107079 (Dec. 2003).

Godfrey, "Inside 802.11e: Making QoS a Reality Over WLAN Connections", http://www.commsdesign.com/printableArticle/?articleID=1700038.

* cited by examiner

WIRELESS LOCAL AREA NETWORK RADIO RESOURCE MANAGEMENT ADMISSION CONTROL

CROSS REFERENCE TO RELATED APPLICATION(S)

This application claims the benefit of U.S. Provisional Application No. 60/534,921, filed Jan. 8, 2004, which is incorporated by reference as if fully set forth herein.

FIELD OF THE INVENTION

The present invention generally relates to a wireless local area network (WLAN) system, and more particularly relates to a radio resource management (RRM) admission control function of a WLAN access point (AP) and a user station.

BACKGROUND

The IEEE 802.11e standard provides modifications to the baseline IEEE 802.11 standard for the support of an admission control function at the access point (AP) of a WLAN. The standard provides the mechanisms by which a station (STA) can request admission of a traffic stream (TS) and by which the AP can notify the STA of the admission or rejection of the request. In the initial 802.11e draft, admission control functionality existed mainly within the STA. In a later release, this functionality has been moved to the AP and is left unspecified. As the AP decides whether to accept or deny a request for admission, the algorithm used for this determination is not specified in the standard and is left for proprietary implementation.

With respect to the AP radio resource management (RRM) admission control function, if the AP supports admission control, it uses admission control mandatory (ACM) flags advertised in the enhanced distributed coordination function (EDCF) parameter set element to indicate whether admission control is enabled for each of the access categories (ACs). In the 802.11e standard, admission control is mandatory for Voice (AC_VO) and Video (AC_VI) access categories. However, the Background (AC_BK) and Best Effort (AC_BE) access categories do not require admission control.

While the minimum contention window (CWmin[AC]), maximum contention window (CWmax[AC]), arbitration interframe space (AIFS[AC]), and transmit opportunity (TXOP[AC]) limit parameters may be adjusted over time by the AP, the ACM bit is static for the duration of the lifetime of the basic service set (BSS). Upon reception of an add traffic stream (ADDTS) message from a STA with QoS functionality (QSTA), the AP (also referred to as a QAP) can decide to accept or reject the request and inform the QSTA of the decision.

With respect to QSTA admission control, each channel access function maintains two variables: Admitted_Time and Used_Time. The Admitted_Time and Used_Time variables are set at association time to zero. Admitted_Time is defined as the maximum amount of medium time that the QSTA can use during a one second period. The Used_Time is maintained by the QSTA and indicates the amount of medium time that the QSTA has used. At each successful or unsuccessful transmission attempt by the QSTA, Used_Time is updated by the total time required to transmit the frame, including the received acknowledge frame and the overhead in accessing the channel (SIFS interval). At one second intervals, the Used_Time is reset to 0 if it is less than or equal to the admitted time.

The STA may subsequently decide to explicitly request admission for a specific AC, which is associated with a specific IEEE 802.1D priority. In order to make such a request, the STA transmits a traffic specification (TSPEC) element contained in an ADDTS request management frame with the following fields specified (i.e., non-zero): nominal MAC service data unit (MSDU) size for the current traffic stream in bytes; mean data rate, the average data rate in bits per second (bps); minimum physical (PHY) rate, the desired minimum PHY rate in bps; and surplus bandwidth allowance, the excess allocation of time and bandwidth over and above the stated application rate requirements. It is noted that these fields are all obtained from operations and maintenance (OA&M) data. The Medium_Time field is not used in the request frame and is set to zero. The QSTA then waits for an ADDTS response message from the QAP.

Once the ADDTS response message is received, the QSTA evaluates it to determine if the admission request was approved. If the QAP allows the admission request, then the Medium_Time value (the transmission time available for a traffic stream) is obtained from a TSPEC element contained in the ADDTS response frame and the Admitted_Time variable is set equal to the Medium_Time value.

The QSTA then is free to commence frame transmission for the admitted traffic stream. The Used_Time is updated each time a frame transmission is initiated as follows:

$$\text{Used\_Time}=\text{Used\_Time}+\text{FrameExchangeTime} \quad \text{Equation (1)}$$

where FrameExchangeTime equals the time required to transmit the frame plus one acknowledgement (ACK) frame plus one short interframe space (SIFS) interval. Every second, the Used_Time is compared with the Admitted_Time:

$$\text{Used\_Time}=\max((\text{Used\_Time}-\text{Admitted\_Time}), 0) \quad \text{Equation (2)}$$

When the Used_Time reaches or exceeds the Admitted_Time value, the corresponding channel access function no longer transmits using the EDCF parameters for that AC, until a future interval where the Used_Time reaches zero again. The 802.11e standard allows the STA to temporarily replace the EDCF parameters for that channel access function with those specified for the access categories Best Effort (AC_BE) or Background (AC_BK) in order to continue transmissions at a lower priority, provided no admission control is required for those access categories.

The STA or AP may choose to tear down an explicit admission request at any time. In order for the STA to tear down an explicit admission, the STA transmits a delete traffic stream (DELTS) frame containing the TSPEC element to the AP. If the STA receives a management notification frame with the action code set to DELTS, it disables the use of the specified AC. If an explicit admission is torn down, the STA disables the use of the AC. The Admitted_Time and the Used_Time values for the AC are then both set to zero.

According to the standard, some ACs can be admitted without an admission control procedure. A STA transmits an ADDTS request to the AP to request admission of traffic in any direction (uplink, downlink, or bi-directional) for an AC that requires admission control. The STA may also have the option to transmit un-admitted traffic under the ACs for which the AP does not require admission control. Therefore, if a STA desires to send data without admission control using an AC that mandates admission control, the STA can use an AC that corresponds to a lower priority and does not require admission control.

SUMMARY

In a wireless local area network having an access point (AP) and at least one station, wherein data is prioritized by access categories, a method for admission control begins by calculating a transmission budget for each access category (AC) and a total transmission budget for all ACs requiring admission control. A traffic stream admission request is sent from a station to the AP. A medium time value for the traffic stream is calculated at the AP, based on information extracted from the admission request. The medium time value is compared to the transmission budget for the AC corresponding to the traffic stream and the total transmission budget. The traffic stream is accepted if the medium time value is not greater than both the transmission budget for the AC corresponding to the traffic stream and the total transmission budget; otherwise, the traffic stream is rejected.

The total transmission budget includes a minimum amount of time allocated to a voice AC and a minimum amount of time allocated to a video AC. The minimum amount of time for the voice AC and the video AC each is a percentage of the maximum transmission time available.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Figure 1:
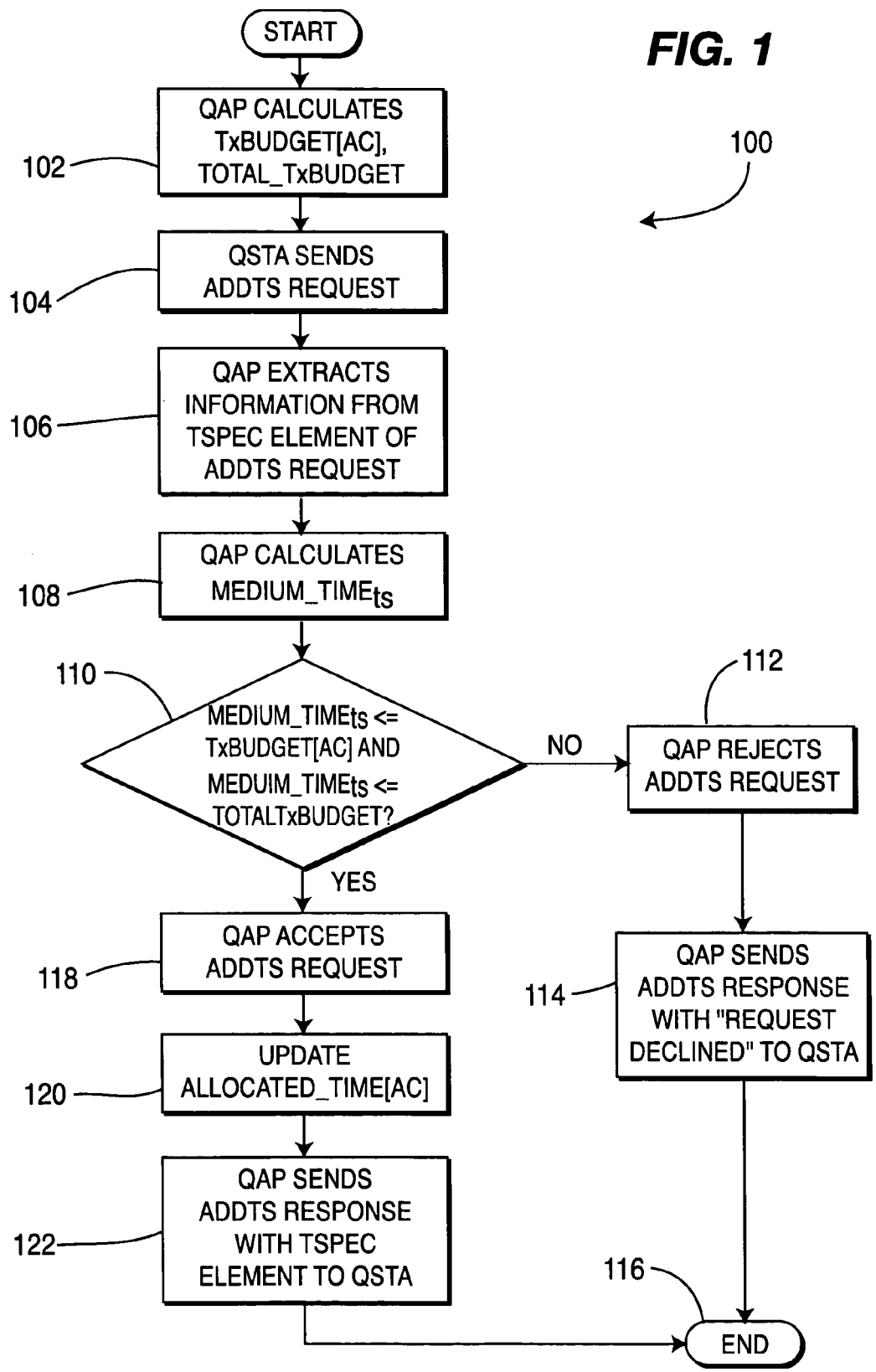
FIG. 1 is a flowchart of a method for admission control in accordance with the present invention.

A method 100 for admission control is shown in FIG. 1. The QAP calculates two parameters: TxBudget[AC], which is the amount of time available for admission of traffic of that AC; and Total_TxBudget, which is the amount of time available for admission of both ACM-enabled ACs (AC_VO and AC_VI; step 102).

Figure 2:
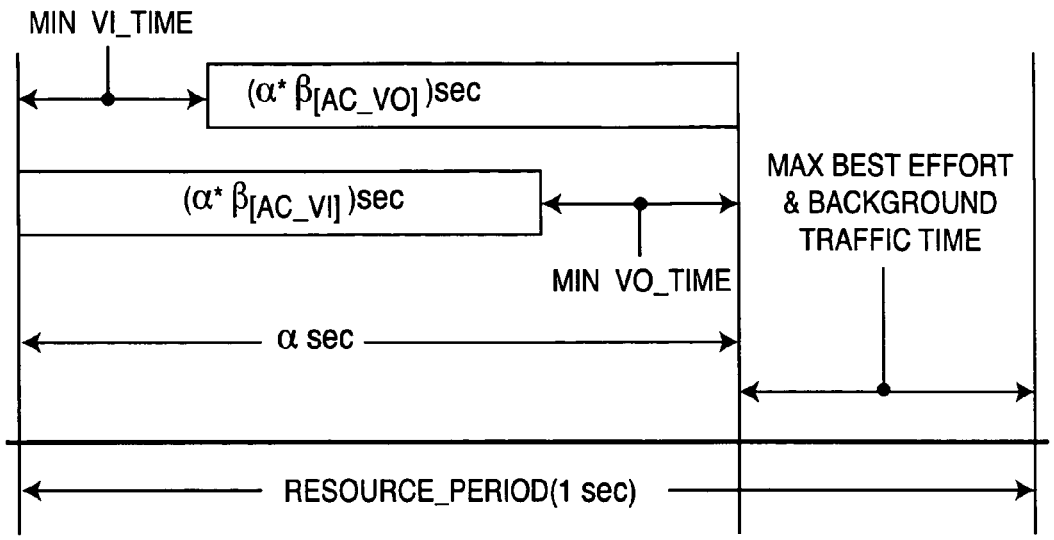
FIG. 2 is a diagram of an admissible time allocation for various ACs.

TxBudget[AC] and Total_TxBudget are defined to be:

$$TxBudget[AC] \text{ (sec)} = TransmitLimit[AC] - Allocated\_Time[AC] \quad \text{Equation (3)}$$

$$Total\_TxBudget(\text{sec}) = \alpha - \sum_{AC}^{AC\_VO, AC\_VI} Allocated\_Time[AC] \quad \text{Equation (4)}$$

where TransmitLimit [AC] is the maximum amount of time that may be allocated for transmissions of a specific AC per one second interval.

$$TransmitLimit[AC] = \beta_{[AC]} \times \alpha \quad \text{Equation (5)}$$

where $\beta_{[AC]}$ is a percentage of $\alpha$ (the maximum transmission time) and should be set such that at any point in time, the system is able to admit a minimum VO_Time (sec) medium time for access category AC_VO and a minimum VI_Time (sec) medium time for access category AC_VI. The setting of $\beta_{[AC\_VO]}$ affects the minimum medium time available for AC_VI, and vice versa. FIG. 2 shows the relationship between $\alpha$ and $\beta$ and the admissible time available.

Allocated_Time [AC] is the amount of time that has been granted admission so far for all traffic streams (TS) under this AC.

$$Allocated\_Time[AC] = \sum_{ts=1}^{n} Current\_Allocated\_Time\_per\_TS_{ts}[AC] \quad \text{Equation (6)}$$

where n is the number of TSs admitted under category AC. Therefore, Equations (3) and (4) could be expressed as:

$$TxBudget[AC] = (\beta_{[AC]} \times \alpha) - \sum_{ts=1}^{n} Current\_Allocated\_Time\_per\_TS_{ts}[AC] \quad \text{Equation (7)}$$

$$Total\_TxBudget = \alpha - \sum_{AC}^{AC\_VO, AC\_VI} \sum_{ts=1}^{n} Current\_Allocated\_Time\_per\_TS_{ts}[AC] \quad \text{Equation (8)}$$

Referring back to FIG. 1, a QSTA specifies its traffic stream requirements in a TSPEC, which is sent to the QAP as an ADDTS request (step 104). The QAP extracts information from the TSPEC element contained in the ADDTS request (step 106). The QAP's admission control algorithm derives a Medium_Time$_{ts}$ value for the requested TS transmissions of a specific AC (step 108). The Medium_Timet$_{ts}$ value is based on the information conveyed in the TSPEC element of the ADDTS request, and is calculated as follows:

$$Medium\_Time_{ts} = Surplus\ Bandwidth\ Allowance \times PPS \times MPDUExchangeTime \quad \text{Equation (9)}$$

where Surplus Bandwidth Allowance specifies the excess allocation of time (and bandwidth) over and above the stated application rates required to transport an MSDU belonging to the traffic stream. The PPS (packet per second) value and the MPDUExchange Time in Equation (9) are defined as $$PPS = \text{ceiling}((Mean\ Data\ Rate/8)/Nominal\ MSDU\ Size) \quad \text{Equation (10)}$$

$$MPDUExchangeTime = \text{duration (Nominal MSDU Size, Minimum Transmitted PHY Rate)} + SIFS + ACK\ duration \quad \text{Equation (11)}$$

In Equation (10), duration( ) is the PLME-TxTIME primitive that returns the duration of a packet based on its payload size and the PHY data rate employed, SIFS is the short interframe space value, and an MPDU is a MAC protocol data unit.

At the time of receiving the admission request, the QAP determines whether to accept or deny the admission request based on the Medium_Time$_{ts}$, the TxBudget[AC], and Total_TxBudget as follows (step 110). If both of the conditions:

$$\text{Medium\_Time}_{ts} <= \text{TxBudget}[AC] \quad \text{Equation (12)}$$

$$\text{Medium\_Time}_{ts} <= \text{Total\_TxBudget} \quad \text{Equation (13)}$$

are not satisfied, then the QAP rejects the ADDTS request (step 112) and sends an ADDTS response with "request declined" back to the QSTA (step 114). The method then terminates (step 116).

If both of the conditions are satisfied (step 110), then the QAP ensures that it has the transmission time available to be allocated and accepts the admission request (step 118).

If the Medium_Time$_{ts}$ meets all the above criteria for admission, then the Allocated_Time[AC] is updated at the QAP as follows (step 120):

$$\text{Allocated\_Time}[AC] = \text{Allocated\_Time}[AC] + \text{Current\_Allocated\_Time\_per\_TS}_{ts}[AC] \quad \text{Equation (13)}$$

where Current_Allocated_Time_per_TS$_{ts}$ [AC] is the allocated time for this particular TSID, i.e., $$\text{Current\_Allocated\_Time\_per\_TS}_{ts}[AC] = \text{Medium\_Time}_{ts} \quad \text{Equation (14)}$$

Consequently, this update will be reflected in both TxBudget[AC] and Total_TxBudget as shown in equations (7) and (8) above.

Having made such a determination, the QAP transmits a TSPEC element to the requesting QSTA contained in an ADDTS response frame (step 122). Since the QAP is accepting the request, the Medium_Time$_{ts}$ field is specified. The method then terminates (step 116).

By considering both TxBudget[AC] and Total_TxBudget, the method 100 ensures that the QAP does not admit more traffic streams (or transmission time) per AC than it can support, which would achieve fairness with the other ACM-enabled AC. The method 100 also ensures that even when the first criterion is met, the total available time can still accommodate the requested Medium_Time$_{ts}$, which would ensure some fairness to the non ACM-enabled traffic (AC_BK and AC_BE) despite their lower priority in the system.

Figure 3:
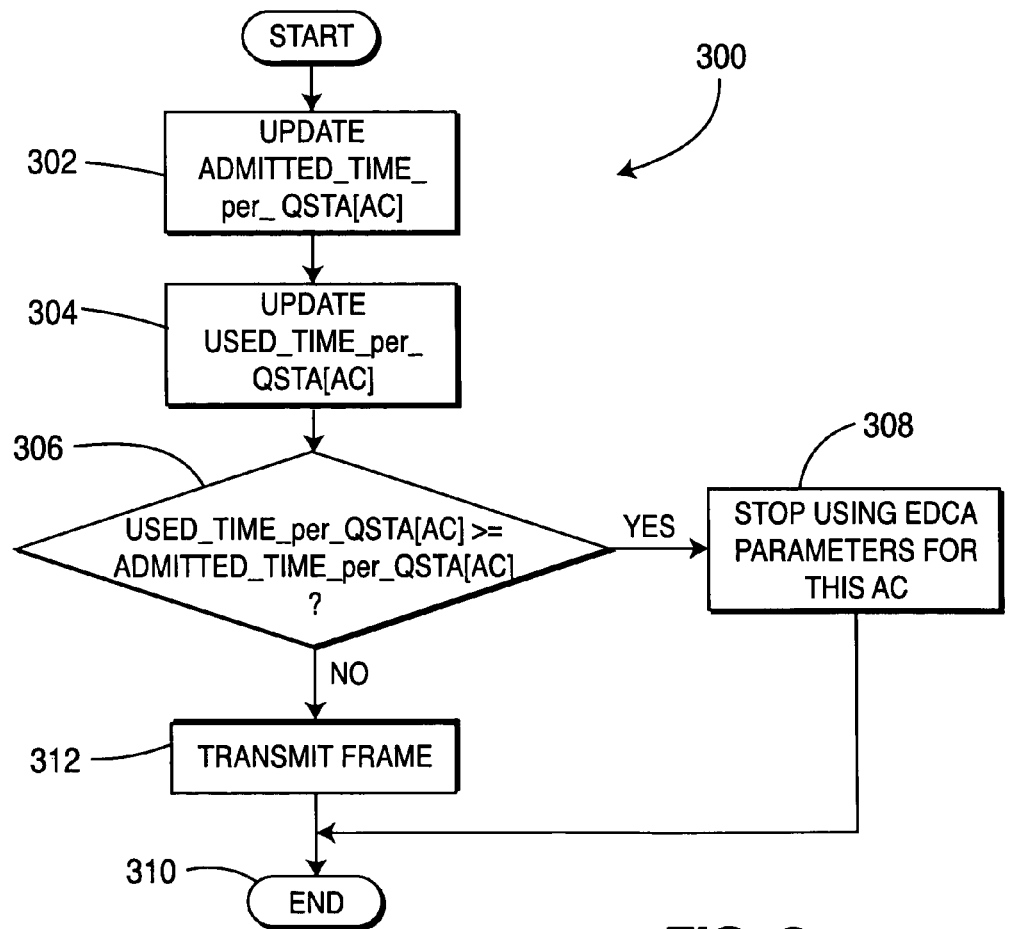
FIG. 3 is a flowchart of a method performed by an AP after admission of a TSPEC.

FIG. 3 shows a method 300 performed by the QAP after admission of a TSPEC. First, the QAP updates a record of admitted time per AC for each QSTA, as follows (step 302):

$$\text{Admitted\_Time\_per\_QSTA}[AC] = \sum_{\substack{ts=1 \\ QSTA\_j}}^{m} \text{Medium\_Time}_{ts}[AC] \quad \text{Equation (15)}$$

where m is the number of traffic streams per QSTA under the same AC, and j is the specific QSTA.

The QAP uses a policing mechanism similar to that used in the QSTA in which it monitors its downlink transmissions and updates a variable Used_Time_per_QSTA at every transmission and at every one second interval (step 304).

After each successful or unsuccessful MPDU transmission or retransmission attempt, Used_Time_per_QSTA is updated according to:

$$\text{Used\_Time\_per\_QSTA}[AC] = \text{Used\_Time\_per\_QSTA} + \text{MPDUExchangeTime} \quad \text{Equation (16)}$$

At one second intervals, Used_Time_per_QSTA is updated according to:

$$\text{Used\_Time\_per\_QSTA}[AC] = \max((\text{Used\_Time\_per\_QSTA} - \text{Admitted\_Time\_per\_QSTA}[AC]), 0) \quad \text{Equation (17)}$$

In the event that a transmission occurs exactly on the one second interval, Used_Time_per_QSTA[AC] is updated according to Equation (16) and then according to Equation (17).

Before the transmission of every frame, the channel access function checks if the Used_Time_per_QSTA[AC] has reached or exceeded the Admitted_Time_per_QSTA[AC] value (step 306). If it is the case, then the channel access function no longer transmits using the EDCA parameters for that AC (step 308), until a future interval where the Used_Time_per_QSTA[AC] would reach zero again. The method then terminates (step 310). In an alternate embodiment, the frame is transmitted without the EDCA parameters and then the method terminates.

If the Used_Time_per_QSTA[AC] is less than the Admitted_Time_per_QSTA[AC] (step 306), then the frame is transmitted using the ECA parameters (step 312) and the method terminates (step 310).

EXAMPLE

Below is an example showing what a QSTA could request for admitting a traffic stream (TS) under an ACM-enabled AC, and the respective Medium_Time$_{ts}$ calculation by the QAP.

| | |
|---|---|
| Surplus Bandwidth Allowance: | 1.1 (10% extra) |
| Nominal MSDU Size: | 1000 bytes |
| Min PHY Rate: | 1 Mbps |
| Mean Data Rate: | 200 Kbps |

PPS = ceiling(Mean Data Rate/8)/Nominal MSDU Size)

$$= \frac{\frac{200 \text{ kbps}}{8}}{1000 \text{ bytes}} = 25 \, (s^{-1})$$

MPDUExchange Time = duration (Nominal MSDU Size,

Minimum Transmitted PHY Rate) +

SIFS + ACK $$= \frac{1000 \text{ byte} \times 8}{1 \text{ Mpbs}} + \text{SIFS} + \text{ACK}$$

$$= 0.008 + 10 \, \mu\text{sec} + \left(\frac{24 \text{ byte} \times 8}{1 \text{ Mpbs}}\right)$$

$$= 0.008202 \text{ sec}$$

Medium_Time$_{ts}$ = Surplus Bandwidth Allowance × PPS ×

MPDUExchangeTime $= 1.1 \times 25 \times 0.008202$ $= 0.2255$ sec $= 22.55$ msec Hence the requested time is 22.55 msec for a single TS. If both TxBudget[AC] and Total_TxBudget are greater than 22.55 msec, then the TS is admitted. This 22.55 msec will be part of the total transmission time available for the QSTA under the requested category.

The input parameters for the admission control algorithm are shown in Table 1.

TABLE 1

Inputs for Contention-based Admission Control

| Symbol | Description | Type | Default Value | Range |
|---|---|---|---|---|
| Minimum PHY Rate | The minimum PHY rate (bps) | Config. parameter | 1 Mbps | NA |
| Nominal MSDU Size | MSDU size for this traffic stream (bytes) | Received parameter | Application Dependent | NA |
| Mean Data Rate | Average data rate (bps) | Received parameter | Application Dependent | NA |
| Surplus Bandwidth Allowance | Excess allocation of time (and bandwidth) over and above the stated application rate requirements | Received parameter | Application Dependent | 1.10~1.50 |
| $\alpha$ (sec) | The maximum transmission time available to voice (AC_VO) and video (AC_VI) traffic. | Config. parameter | 0.8 sec | 0.5~0.9 |
| $\beta_{[AC\_VO]}$ | The percentage amount of admissible time (fraction of $\alpha$) that AC_VO can be allocated for transmission | Config. parameter | 80% | 0~100% |
| $\beta_{[AC\_VI]}$ | The percentage amount of admissible time (fraction of $\alpha$) that AC_VI can be allocated for transmission | Config parameter | 80% | 0~100% |
| VO_Time | Minimum medium time for access category AC_VO | Config parameter | $\alpha * (1 - \beta_{[AC\_VI]})$ | $0 \sim \alpha * \beta_{[AC\_VI]}$ |
| VI_Time | Minimum medium time for access category AC_VI | Config parameter | $\alpha * (1 - \beta_{[AC\_VO]})$ | $0 \sim \alpha * \beta_{[AC\_VO]}$ |

The received parameters are taken from the ADDTS request. The value of $\alpha$ depends on the number of users that can be accommodated without congestions. The $\beta_{[AC\_VO]}$ value for either AC should start below 100%; however, it could be stretched to 100%.

The output parameters for the admission control algorithm are shown in Table 2.

TABLE 2

Outputs for Contention-based Admission Control

| Parameters | Description |
|---|---|
| Medium_Time$_{ts}$ | Transmission time available for a certain traffic stream |

In a second embodiment of the present invention, the AP admission control operates on a per-user basis. For example, in baseline IEEE 802.11 stations (e.g., 802.11a, 802.11b and 802.11g), ACs are not utilized during admission requests, which hinders the AP from assessing TxBudget according to the method of FIG. 1. Accordingly, the budget can instead be allocated according to the number of stations presently engaged by the WLAN. The budget is preferably allocated evenly among the stations. Alternatively, the budget may be allocated to each STA on a priority basis, according to standard or predetermined priority types, such as "best effort." For example, in a voice over Internet protocol (VoIP) environment, a Web browsing traffic stream may be assigned a lower priority of best effort compared to a voice traffic stream. Under this third embodiment, the admission control algorithm preferably performs admission control upon association requests of non-802.11e compliant stations. For example, the AP could reject all association requests in a heavily loaded BSS. Such an admission control algorithm could be used by non-802.11e compliant APs, as well as 802.11e compliant APs for the admission control of non-802.11e compliant stations.

Although the features and elements of the present invention are described in the preferred embodiments in particular combinations, each feature or element can be used alone (without the other features and elements of the preferred embodiments) or in various combinations with or without other features and elements of the present invention. While specific embodiments of the present invention have been shown and described, many modifications and variations could be made by one skilled in the art without departing from the scope of the invention. The above description serves to illustrate and not limit the particular invention in any way.

What is claimed is:

1. A method for admission control in wireless communications, wherein data is prioritized by access categories, the method comprising:
   calculating a transmission budget for each access category (AC) at an access point (AP);

calculating a total transmission budget for all ACs requiring admission control;

receiving a traffic stream admission request at the AP;

calculating a medium time value for the traffic stream at the AP, the medium time value being based on the admission request;

comparing the medium time value to the transmission budget for the AC corresponding to the traffic stream and the total transmission budget;

accepting the traffic stream if the medium time value is not greater than both the transmission budget for the AC corresponding to the traffic stream and the total transmission budget; and rejecting the traffic stream if the medium time value is greater than one of the transmission budget for the AC corresponding to the traffic stream and the total transmission budget.

2. The method according to claim 1, wherein the transmission budget for each access category (AC) is the amount of time available for the admission of traffic in the AC and is equal to the total time available for the AC minus a sum of the time currently allocated to all traffic streams the AC.

3. The method according to claim 1, wherein the total transmission budget is an amount of time available for the admission of traffic on all admission control mandatory ACs and is equal to the maximum transmission time minus a sum of the time currently allocated to all traffic stream in the ACs that are admission control mandatory.

4. The method according to claim 1, wherein the total transmission budget includes:

a minimum amount of time allocated to a voice AC; and a minimum amount of time allocated to a video AC.

5. The method according to claim 4, wherein the minimum amount of time for a voice AC and the minimum amount of time for a video AC are both a percentage of the maximum transmission time available.

6. The method according to claim 1, wherein receiving includes:

creating a traffic specification element which specifies traffic stream requirements.

7. The method according to claim 1, wherein the medium time value is the transmission time available for the traffic stream and is calculated based on the extracted information from the admission request according to the formula:

$$\text{Medium\_Time} = \text{Surplus Bandwidth Allowance} \times \text{PPS} \times \text{MPDUExchangeTime},$$

where

Surplus Bandwidth Allowance specifies the excess allocation of time and bandwidth over and above the stated application rates required to transport a medium access control (MAC) service data unit (MSDU) belonging to the traffic stream;

PPS (packet per second)=ceiling((Mean Data Rate/8)/Nominal MSDU Size); and

MPDUExchangeTime=duration (Nominal MSDU Size, Minimum Transmitted PHY Rate)+SIFS+acknowledgement duration, where the duration function returns the duration of a packet based on its payload size and the physical (PHY) data rate employed, and SIFS is a short interframe space value.

8. The method according to claim 1, wherein if the traffic stream is accepted, the method further comprises:

updating the allocated time value for the AC based on the newly accepted traffic stream; and sending a response message to the station.

9. The method according to claim 8, further comprising:

calculating a sum of medium time values for each traffic stream in the same AC;

updating a used time value per station per AC;

comparing the sum and the used time value for an AC;

transmitting a frame with existing parameters if the sum is less than the used time value; and transmitting a frame without parameters if the sum is not less than the used time value.

* * * * *

UNITED STATES PATENT AND TRADEMARK OFFICE
CERTIFICATE OF CORRECTION

PATENT NO.       : 7,506,043 B2
APPLICATION NO.  : 10/977041
DATED            : March 17, 2009
INVENTOR(S)      : Ali et al.

It is certified that error appears in the above-identified patent and that said Letters Patent is hereby corrected as shown below:

At column 3, delete Equation (5), and insert therefor
--TransmitLimit[AC] = $\beta_{[AC]}$ x $\alpha$--.

At column 6, line 23, before the word "parameters" delete "ECA" and insert therefor --EDCA--.

At column 6, delete lines 47 & 48 and insert therefor -- $= \frac{1000 bytex8}{1 Mbps} + SIFS + ACK$ --.

At column 6, delete lines 49 & 50 and insert therefor
-- $= 0.008 + 10 \; \mu sec + \left( \frac{24 bytex8}{1 Mbps} \right)$ --.

At claim 2, column 9, line 19, before the word "amount" delete "the" and insert therefor --an--.

At claim 2, column 9, line 21, before the word "total" delete "the" and insert therefor --a--.

At claim 2, column 9, line 21, after the words "sum of" delete "the".

At claim 2, column 9, line 22, before the words "the AC" insert --in--.

At claim 3, column 9, line 24, after the words "available for" delete "the".

At claim 3, column 9, line 26, before the word "maximum" delete "the" and insert therefor --a--.

At claim 3, column 9, line 27, before the word "currently" delete "the time" and insert therefor --times--.

At claim 3, column 9, line 27, before the words "in the" delete "stream" and insert therefor --streams--.

At claim 5, column 9, line 35, before the word "maximum" delete "the" and insert therefor --a--.

UNITED STATES PATENT AND TRADEMARK OFFICE
CERTIFICATE OF CORRECTION

PATENT NO. : 7,506,043 B2
APPLICATION NO. : 10/977041
DATED : March 17, 2009
INVENTOR(S) : Ali et al.

It is certified that error appears in the above-identified patent and that said Letters Patent is hereby corrected as shown below:

At claim 7, column 10, line 4, before the word "transmission" delete "the" and insert therefor --a--.

At claim 7, column 10, line 5, before the word "extracted" delete "the".

At claim 7, column 10, line 11, before the word "stated" delete "the".

At claim 7, column 10, line 20, before the word "duration" delete "the" and insert therefor --a--.

At claim 9, column 10, line 31, before "AC" delete "the same" and insert therefor --an--.

Signed and Sealed this

Ninth Day of June, 2009

JOHN DOLL
*Acting Director of the United States Patent and Trademark Office*